United States Patent [19]

Mollenauer

[11] 4,314,211

[45] Feb. 2, 1982

[54] SERVO-CONTROLLED OPTICAL LENGTH OF MODE-LOCKED LASERS

[75] Inventor: Linn F. Mollenauer, Colts Neck, N.J.

[73] Assignee: Bell Telephone Laboratories, Incorporated, Murray Hill, N.J.

[21] Appl. No.: 115,136

[22] Filed: Jan. 24, 1980

[51] Int. Cl.³ .............................................. H01S 3/13
[52] U.S. Cl. ...................................... 372/32; 372/38; 372/102
[58] Field of Search ..................... 331/94.5 C, 94.5 D, 331/94.5 ML, 94.5 S

[56] References Cited

U.S. PATENT DOCUMENTS

| | | | |
|---|---|---|---|
| 3,529,263 | 9/1970 | Simmons | 331/94.5 C |
| 3,611,181 | 10/1971 | Lary et al. | 331/94.5 C |
| 3,613,024 | 10/1971 | Gensic et al. | 331/94.5 Q |
| 3,686,585 | 8/1972 | Javan et al. | 331/94.5 S |
| 3,775,699 | 11/1973 | Cassels | 331/94.5 C |
| 4,103,254 | 7/1978 | Chikami | 331/94.5 S |

*Primary Examiner*—William L. Sikes

*Attorney, Agent, or Firm*—Michael B. Einschlag

[57] ABSTRACT

An acousto-optic modulator (2) is inserted into a laser cavity so that when the Bragg condition is satisfied, light will be scattered out of the cavity into two beams (101 and 102) at the same angle on opposite sides of an internal laser cavity pulse (100). Detectors (21 and 22) are disposed to intercept the two scattered pulses and yield electrical signals responsive to their intensity. When the internal laser cavity pulse is in phase with the excitation the time average intensities obtained by the detectors will be small and equal. However, should the internal laser cavity pulse be a bit late, the intensity of one of the scattered beams will increase while the other will decrease. If the internal laser cavity pulse is early, the opposite will be observed. The electrical signals are arranged to have opposite signs and their sum is used as an error signal for a closed feedback loop to adjust the optical path length of the laser cavity. A second embodiment for generating the electrical signals using dichroic pulse retarders and product detectors is also disclosed.

7 Claims, 4 Drawing Figures

SERVO-CONTROLLED OPTICAL LENGTH OF MODE-LOCKED LASERS

BACKGROUND OF THE INVENTION

This invention pertains to the field of mode-locked lasers and more specifically to the field of servo-controlled mode-locked lasers.

In any passively mode-locked laser, whether achieved by the use of an intracavity modulator or by synchronous pumping, it is necessary to match the laser cavity frequency, C/2L, to the driving frequency with great precision in order to achieve the best mode locking (C is the speed of light and L is the laser cavity length). In some mode-locked lasers, such as Nd:YAG, the major part of the cavity beam is open to the atmosphere. Since $n-1 \cong 3 \times 10^{-4}$ for air at standard temperature and pressure (S.T.P.), where n is the index of refraction, and since daily barometric pressure variations can be as great as 0.1 ATM, fractional changes in C/2L as great as $30 \times 10^{-6}$ are to be expected.

One general approach to achieving stability is to detect the difference in relative timing, or phase, between the mode-locked laser output pulses and the driving mechanism. This phase-shift measurement has been accomplished in the prior art by first converting a sample of the laser pulses into an electrical analog and then making the phase comparison in an electrical circuit. This approach has been successful, especially in those lasers where the mode-locking is achieved by way of an electrically driven modulator. However, this approach has several limitations. Among these are the following: (1) lack of a detector with sufficiently fast response to truly represent picosecond pulses in its electrical output, (2) difficulties in maintaining sufficient phase stability in the associated r.f. circuitry, (3) possibility of drift between the phase of the r.f. drive voltage and the phase of the modulator response, and (4) the need to provide for and to discover empirically the phase shift of the r.f. required for zero output of the phase-sensitive detector at the point of optimium adjustment of the laser cavity length.

SUMMARY OF THE INVENTION

The relative timing or phase between mode-locked laser pulses in the output from a laser cavity and the driving excitation pulses provides a sensitive measure of the laser cavity length detuning. In accordance with one embodiment of the present invention, an acousto-optic modulator is inserted into the laser cavity. When the Bragg condition at the modulator is satisfied, radiation in an internal laser cavity pulse will be scattered out of the laser cavity into two beams. The two beams leave the laser cavity at the same angle to, but on opposite sides of, the internal laser cavity pulse. Two detectors are disposed to intercept the two beams. When the internal laser cavity pulse is in phase with a driving excitation means, the time averaged intensities of the two beams will be small and equal. If the internal laser cavity pulse is a bit late, the intensity of one of the beams will increase while the intensity of the other one of the beams will decrease. Should the internal laser cavity pulse be a bit early, the opposite of the above will be observed.

The detectors produce electrical signals responsive to the intensity of the two beams. The electrical signals are generated with opposite signals so that their sum will pass through zero as the phase between the laser pulse and the driving excitation means is zero. The sum of the two electric signals is used as a control signal for a closed feedback loop to adjust the optical length of the laser cavity.

In another embodiment of the present invention, suitable for use with a coaxially pumped synchronously mode-locked laser, the pulse output from a laser cavity is split into a first and second pulse. Both the first and second pulse comprise components of an internal laser cavity pulse and a pulp pulse. The first pulse passes through a dichroic pulse retarder to retard the component of the pump pulse relative to the component of the internal laser cavity pulse and then impinges upon a first product detector. The second pulse passes through a dichroic pulse retarder to retard the component of the internal laser cavity pulse relative to the component of the pump pulse and then impinges upon a second product detector. The output of the first product detector increases as the component of the internal laser cavity pulse is late with respect to the component of the pump pulse and the output of the second product detector increases as the component of the internal laser cavity pulse is early with respect to the component of the pump pulse. The electrical output of the second product detector is set to be equal in magnitude, but opposite in sign to the electrical output of the first product detector. A sum signal is produced and utilized in the same manner as for the embodiment described hereinabove.

BRIEF DESCRIPTION OF THE DRAWING

An understanding of the present invention may be gained from a consideration of the detailed description presented hereinbelow in connection with the accompanying drawings in which.

DETAILED DESCRIPTION

In a passively mode-locked laser, whether mode-locking is achieved by the use of an intracavity modulator or by means of synchronous pumping, it is necessary to match the laser cavity C/2L frequency (C is the speed of light and L is the optical length of the laser cavity, including the effect of the various indices of refraction distributed along the physical path) to the frequency, $f_0$, of the driving excitation in order to achieve the best mode locking. The required precision of matching is given by the following:

$$((C/2L) - f_o)/f_o << < t/T_o \qquad (1)$$

where t is the mode-locked pulse width and $T_o = 1/f_o$. Since t is typically picoseconds and $T_o$ nanoseconds, the fraction $t/T_o \approx 10^{-3}$ or $10^{-4}$. In practice the fraction on the left hand side of equation (1) must often be less than $10^{-6}$.

In some mode-locked lasers, such as Nd:YAG, the major portion of the internal laser cavity beam path is open to the atmosphere. Since $n - 1 \approx 3 \times 10^{-4}$ for air at S.T.P. (n is the index of refraction), and since daily barometric pressure variations can be as great as 0.1 ATM, fractional changes in C/2L as great as $30 \times 10^{-6}$ are to be expected.

A reference useful in feedback systems for detecting these changes is the time lag, or advance, $\delta t$ between the driving frequency $f_o$ of the laser excitation means and the laser output pulses. $\delta t$ is given by the following:

$$\delta t/T_o = Q_{eff}(f_o - C/2L)/f_o \qquad (2)$$

where $Q_{eff}$ is the effective Q factor of the laser oscillator. This relation is valid only over a narrow region of detuning of the laser oscillator from "good" mode-locking. Empiricial results show that $Q_{eff}$ can be on the order of 100 or more. This makes the phase shift a sensitive measure of cavity length detuning.

Figure 1:
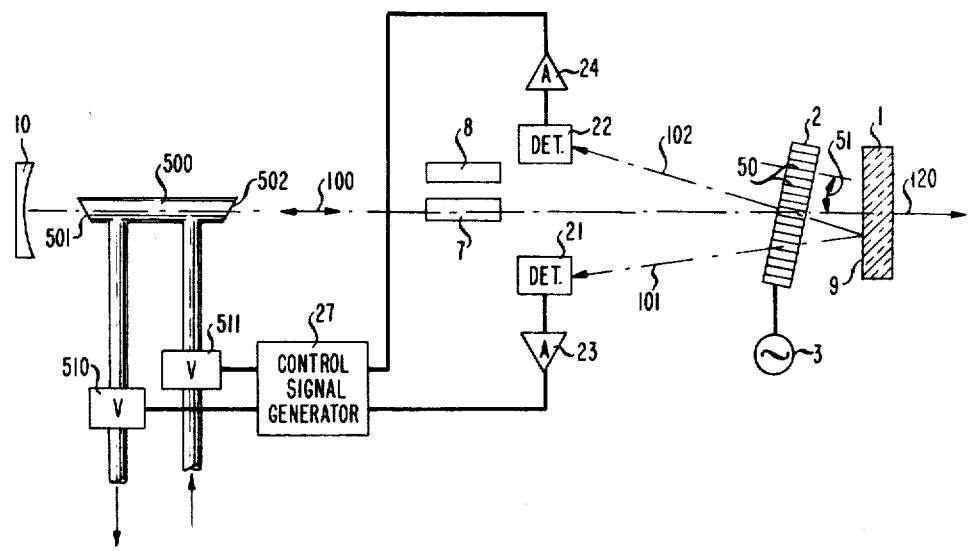
FIG. 1 shows, in diagrammatic form, a mode-locked laser utilizing an acousto-optic modulator, which laser includes radiation detectors, disposed to intercept radiation scattered out of the laser cavity, by the acousto-optic modulator. The detectors provide electric signals for use in a feedback loop, which feedback loop adjusts the optical path length of an internal laser cavity pulse.

FIG. 1 shows an embodiment constructed in accordance with the present invention for automatically detecting the phase shift in a laser driven by an acousto-optic modulator. The laser comprises mirror 10, laser material 7, excitation means 8, and output mirror 1. The laser cavity is formed by mirrors 1 and 10. Acousto-optic modulator 2 is disposed in the laser cavity in the path of internal laser cavity pulse 100. Acousto-optic modulator 2 comprises a block of fused silica, or some other suitable material, in which standing, longitudinal sound waves 50 have been set up by excitation means 3. Lines 50 within acousto-optic modulator 2 show the crests of these longitudinal sound waves. Acousto-optic modulator 2 is disposed so that crests 50 make an angle 51 with respect to internal laser cavity pulse 100.

When the Bragg condition is satisfied, radiation will be scattered into beams 101 and 102 as shown in FIG. 1. The Bragg condition is given by $$m\lambda = (4v/f_o) \sin \theta \qquad (3)$$

where m is an integer, $\lambda$ is the vacuum wavelength of the interval laser cavity pulse, v is the longitudinal sound velocity inside acousto-optic modulator 2, $f_o/2$ is the sound frequency of the waves inside acousto-optic modulator 2 and $\theta$ is the value of angle 51. The wavelength of light inside acousto-optic modulator 2 is $\lambda/n$, where n is the index of the modulator material, but in the Bragg condition there is a compensating factor of n due to the fact that the internal angles are reduced by n. This eliminates n from the final expression.

The scattering of the internal laser cavity pulse occurs at all times except when the longitudinal standing wave amplitude passes through zero. This occurs twice per cycle and I will refer to the narrow interval of time surrounding the instant of time at which the longitudinal wave amplitude passes through zero as the "modulator-on-time".

For best mode-locking, the internal laser cavity beam pulse will be located at surface 9 of output mirror 1 at the middle of the "modulator-on-time" interval. For this condition the average intensities of beams 101 and 102 detected by radiation detectors 21 and 22 will be small and equal. However, should the internal laser cavity pulse be a bit late, the intensity of beam 102, detected by detector 22, will increase while the intensity of beam 101, detected by detector 21, will decrease. If the internal laser cavity pulse is early then the opposite will occur.

The outputs of detectors 21 and 22 are arranged to yield electrical signals of opposite sign. These signals are amplified in amplifiers 23 and 24 respectively and fed into control signal generator 27. Adjustments are made by control signal generator 27 to compensate for possibly different detector response factors and for different transmission losses in the optical path of beams 101 and 102.

The sum of the electrical signals is formed by control signal generator 27. The sum passes through zero as the phase of the internal laser cavity pulse is changed from late to early or vice versa and the zero of the sum signal is made to correspond exactly to the condition for best mode locking. The sum signal then becomes the control signal for an apparatus which adjusts the optical path length of the internal laser cavity pulse.

One embodiment, shown in FIG. 1, for adjusting the optical path length of the internal laser cavity pulse comprises enclosing a part of the internal laser cavity pulse path in a pressure cell 500 with Brewster angle windows 501 and 502. In this way, pressure changes of a fraction of 1 ATM within the cell are made to compensate both for atmospheric pressure change as well as for changes in the physical length of the cavity brought about by thermal expansion. The required pressure changes in the cell are made automatically by application of output signals from control signal generator 27 to gas flow controls 510 and 511. An example of a gas suitable for use with a Nd:YAG laser is nitrogen.

Figure 2:
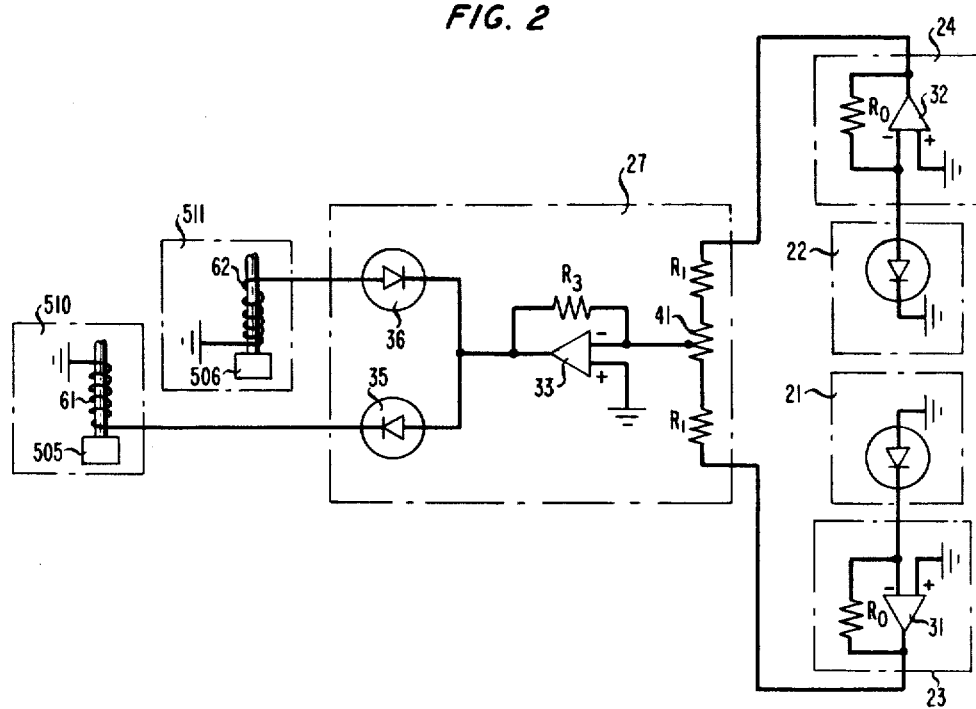
FIG. 2 shows, in schematic form, a circuit for converting the electric signals obtained from the detectors shown in FIG. 1 into appropriate control signals for use in the feedback loop.

FIG. 2 shows an arrangement for providing pressure changes in pressure cell 500 which are responsive to the intensity of beams 101 and 102. Detectors 21 and 22 are photovoltaic diodes which are well known to those skilled in the art. We have chosen photovoltaic diodes which work best at zero bias. The electric signals produced when beams 101 and 102 impinge upon detectors 21 and 22 are fed to amplifiers 23 and 24 comprised of operational amplifiers 31 and 32, respectively. These operational amplifiers are well known in the art and are shown without bias voltages for the sake of clarity. Notice that detectors 21 and 22 produce signals of different sign. Operational amplifiers 31 and 32 act as current-to-voltage converters for detectors 21 and 22.

The outputs from amplifiers 23 and 24 are fed into control signal generator 27. Resistor 41 in control signal generator 27 provides for the adjustment of the signals produced by detectors 21 and 22 due to their different response factors and due to any difference in the optical paths of beams 101 and 102. The adjusted signals are summed and operational amplifier 33 magnifies the signal to form the control signal. This control signal is placed across diodes 35 and 36 to form the output of control signal generator 27.

When the means for adjusting the optical path length comprises the pressure filled cavity 500 described hereinabove, gas flow controls 510 and 511 comprise solenoids 61 and 62 and gas valves 505 and 506, which valves are actuated by solenoids 61 and 62. One of these valves, 506, allows the gas pressure and thereby the optical path length to increase in the cell. The other one of these valves, 505, allows the gas pressure and thereby the optical length to decrease in pressure. When the signal across diode 35 is positive, valve 505 is actuated and the optical length of the cavity decreases. When the signal across diode 36 is negative, valve 506 is actuated and the optical length of the cavity increases. Since the timing of the internal laser cavity pulse responds to the changes in the optical length of the cavity, the feedback loop is closed and mode-locking will be maintained in nearly perfect adjustment.

Figure 3:
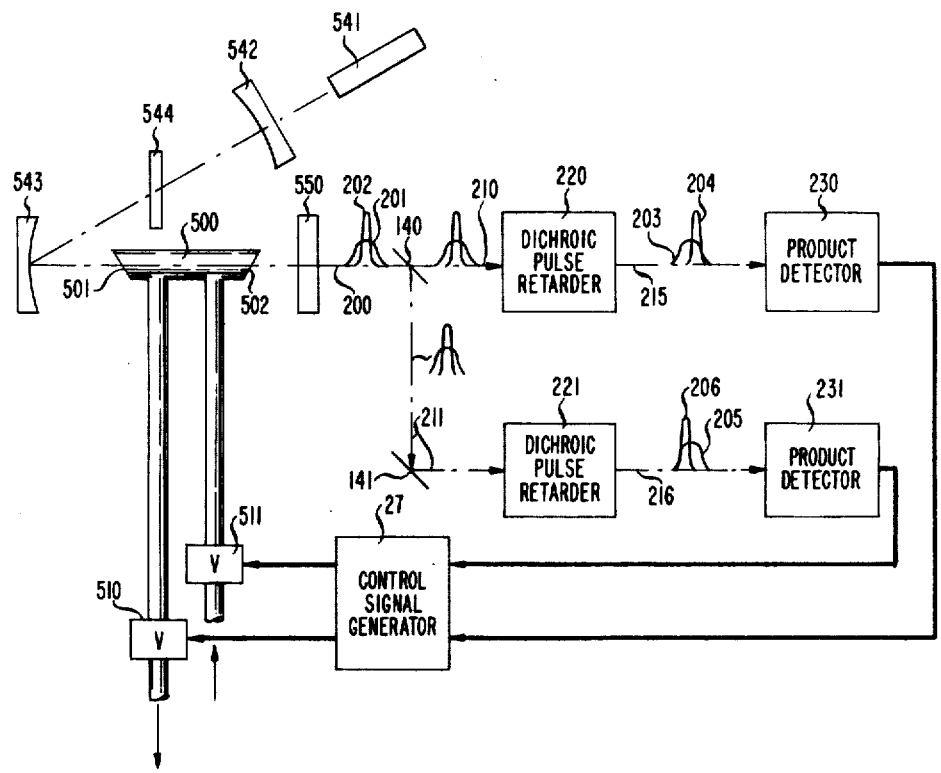
FIG. 3 discloses, in diagrammatic form, a coaxially pumped mode-locked laser, which laser includes dichroic pulse retarders disposed to intercept radiation output from the laser cavity. The retarders, along with product detectors, provide electric signals for use in a feedback loop, which feedback loop adjusts the optical path length of an internal laser cavity pulse.

The following describes a second embodiment of the present invention suitable for use with a synchrously mode-locked laser, such as that shown in FIG. 3. This embodiment involves a direct optical phase comparison of the pump beam pulse and the output laser beam pulse for a coaxially pumped mode-locked laser comprising pump laser 541, mirrors 542, 543 and 550 and laser material 544. Pump laser 541 injects a pump pulse through mirror 542 into the laser cavity formed by mirrors 542, 543 and 550. The pump pulse excites laser material 544, which is oriented at Brewster's angle, to form an internal laser cavity pulse which propagates colinearly with the pump pulse. Pulse 200 which emerges from the laser cavity through output mirror 550 comprises components of the pump pulse, as pulse 201, and components of the internal laser cavity pulse as pulse 202. Beam splitter 140 splits pulse 200 into pulses 210 and 211, each containing portions of pulses 201 and 202. Pulse 210 passes through dichroic pulse retarder 220 to produce pulse 215. In pulse 215 we find that a portion of the component of the pump pulse, pulse 203, has been retarded with respect to a portion of the component of the internal laser cavity pulse, pulse 204.

After reflection from mirror 141, pulse 211 is made to pass through dichroic pulse retarder 221 to produce pulse 216. In pulse 216 we find that a portion of the component of the internal laser cavity pulse, pulse 206, has been retarded with respect to a portion of the component of the pump pulse, pulse 205.

Pulse 215 impinges upon product detector 230 and pulse 216 impinges upon product detector 231. The output of product detector 230 increases as pulse 202 is late with respect to the pulse 201 in pulse 200. The output of product detector 231 increases as pulse 202 is early with respect to the pulse 201 in pulse 200.

The electrical output of product detector 230 is set to be equal in magnitude but opposite in sign to the electrical output of product detector 231 when the internal laser cavity pulse is properly timed with respect to the pump pulse.

From here on the mechanism for controlling the optical path length of the laser cavity is the same as was described hereinabove for the first embodiment.

Figure 4:
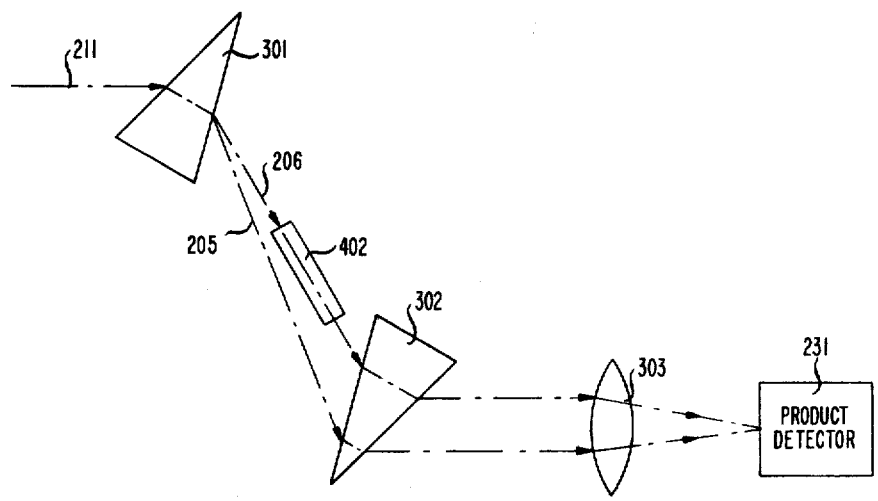
FIG. 4 discloses, in pictorial form, an embodiment for producing a dichroic pulse retarder.

It should be clear to those skilled in the art as to how dichroic retarders may be fabricated. One specific example is shown in FIG. 4. Pulse 211 impinges upon prism 301, which prism separates pulse 211 into the pulse 206, corresponding to a component of the internal laser cavity pulse, and pulse 205, corresponding to a component of the pump pulse. Retarder plate 402 is inserted into the path of pulse 206 to retard it by a predetermined amount. Prism 302, identical in material and angle to prism 301, then renders pulses 205 and 206 parallel again so that they may be brought to a common focus, if desired. In FIG. 4, lens 303 brings the beams to a common focus at product detector 231. It should be clear that the dichroic pulse retarder 220 in FIG. 3 may be fabricated as in FIG. 4 by merely placing a retarder plate, like 402, in the path of the pulse 205 instead of in the path of pulse 206.

It should also be clear to those skilled in the art as to how product detectors may be fabricated. One embodiment comprises a nonlinear crystal, phase-matched to generate radiation at a frequency corresponding to the sum of the pump and laser frequencies.

I claim:

1. A mode-locked laser comprising:
   at least two mirrors (10, 1) disposed to form a laser cavity having an optical path length;
   a laser medium (7) disposed within said laser cavity;
   means (8) for exciting said laser medium to form an internal laser cavity pulse;
   a transducer (2) disposed in said laser cavity;
   means (3) for generating a standing wave in said transducer, whereby radiation from said internal laser cavity pulse is scattered out of said laser cavity on either side of said internal laser cavity pulse;
   characterized in that
   said laser further includes a first radiation detector (21) for generating a first electric signal in response to a portion (101) of the radiation scattered to one side of said internal laser cavity pulse (100);
   a second radiation detector (22) for generating a second electric signal in response to a portion (102) of the radiation scattered to the other side of said internal laser cavity pulse from said one side;
   (means (23, 24, and 27) for producing control signals in response to said first electric signal and said second electric signal; and
   means (500, 510, and 511) for adjusting said optical path length in response to said control signals.

2. The mode-locked laser defined in claim 1 wherein said means for adjusting said optical path length of said internal beam comprises:
   an enclosed chamber (500) disposed in said laser cavity in the path of said internal laser cavity pulse, said chamber having windows oriented at Brewster's angle;
   means (511) for admitting a gas into said chamber in response to said control signals; and
   means (510) for releasing said gas from said chamber in response to said control signals.

3. The mode-locked laser defined in claim 1 wherein said transducer is an ultrasonic transducer.

4. A mode-locked laser comprising:
   at least two mirrors (542, 543, and 550) disposed to form a laser cavity having an optical path length;
   a laser medium (544) disposed within said laser cavity;
   laser means (541) for pumping said laser medium with a pump pulse to produce an internal laser cavity pulse, which pump pulse propagates collinearly with said internal laser cavity pulse;
   characterized in that said laser further includes splitting means (140), disposed outside said laser cavity in the path of an output from said laser cavity, for splitting said output into a first beam and a second beam, said first beam and said second beam containing components of said internal laser cavity pulse and said pump pulse;
   first retarder means (220), disposed in the path of said first beam, for retarding said component of said internal laser cavity pulse with respect to said component of said pump pulse;
   second retarder means (221), disposed in the path of said second beam, for retarding said component of said internal laser cavity pulse with respect to said component of said pump pulse;

first product means (230), disposed to intercept the output from said first retarder means, for producing a first electric signal responsive to the temporal overlap of said component of said internal laser cavity pulse and said component of said pump pulse in said output from said first retarder means;

second product means (231), disposed to intercept the output from said second retarder means, for producing a second electric signal responsive to the temporal overlap of said component of said internal laser cavity pulse and said component of said pump pulse in the output from said second retarder means;

means (27) for producing control signals in response to said first electric signal and said second electric signal; and means (500, 510 and 511) for adjusting said optical path length in response to said control signals.

5. The mode-locked laser defined in claim 4 wherein said means for adjusting said optical path length of said internal beam comprises:

an enclosed chamber (500) disposed in said laser cavity in the path of said internal laser cavity pulse beam, said chamber having windows oriented at Brewster's angle;

means (511) for admitting a gas into said chamber in response to said control signals; and means (510) for releasing said gas from said chamber in response to said control signals.

6. The mode-locked laser defined in claim 4 wherein said retarder means (220 or 221) comprises a first prism (301) disposed to direct said component of said internal laser cavity pulse and said component of said pump pulse to travel in two directions;

a retarder plate (402) disposed in the path of one of said components; and a second prism (302) disposed to redirect said component of said internal laser cavity pulse and said component of said pump pulse to travel in the same direction.

7. The mode-locked laser defined in claim 6 wherein said product detector comprises a nonlinear crystal, phase-matched to generate radiation at a frequency corresponding to the sum of the frequencies of said internal laser cavity pulse and said pump pulse.

* * * * *